US012772297B2

(12) United States Patent
Li et al.

(10) Patent No.: US 12,772,297 B2
(45) Date of Patent: Oct. 20, 2026

(54) METHOD, APPARATUS, AND SYSTEM OF PRACH TRANSMISSION WITH REPETITION, AND COMPUTER-READABLE STORAGE MEDIUM

(71) Applicant: CHINA TELECOM CORPORATION LIMITED, Beijing (CN)

(72) Inventors: Nanxi Li, Beijing (CN); Jianchi Zhu, Beijing (CN); Hang Yin, Beijing (CN); Xiaoming She, Beijing (CN); Peng Chen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 19/109,390

(22) PCT Filed: Aug. 3, 2023

(86) PCT No.: PCT/CN2023/111013
§ 371 (c)(1),
(2) Date: Mar. 6, 2025

(87) PCT Pub. No.: WO2024/051411
PCT Pub. Date: Mar. 14, 2024

(65) Prior Publication Data

US 2026/0082427 A1 Mar. 19, 2026

(30) Foreign Application Priority Data

Sep. 9, 2022 (CN) ........................ 202211101995.1

(51) Int. Cl.
*H04W 4/00* (2018.01)
*H04W 72/232* (2023.01)
*H04W 74/0833* (2024.01)

(52) U.S. Cl.
CPC ..... *H04W 74/0833* (2013.01); *H04W 72/232* (2023.01)

(58) Field of Classification Search
CPC ........................ H04W 74/0833; H04W 72/232
See application file for complete search history.

(56) References Cited

U.S. PATENT DOCUMENTS

2018/0098326 A1 4/2018 Kitagawa et al.
2019/0387554 A1 12/2019 Guo et al.
(Continued)

FOREIGN PATENT DOCUMENTS

CN 109906661 A 6/2019
CN 110392433 A 10/2019
(Continued)

OTHER PUBLICATIONS

Panasonic, "NR-U PRACH resource enhancement", 3GPP TSG RAN WG1 #96bis R1-1904595 Xi'an, China, Apr. 8-12, 2019, 4 Pages.
International Search Report and Written Opinion dated Oct. 13, 2023 in CN Application No. PCT/CN2023/111013 11 pages.
China Office Action dated Apr. 25, 2024 in CN Application No. 202211101995.1 with English Translation, 24 pages.
(Continued)

*Primary Examiner* — Omoniyi Obayanju
(74) *Attorney, Agent, or Firm* — Andrew M. Calderon; Calderon Safran & Wright P.C.

(57) ABSTRACT

The present disclosure relates to the technical field of wireless communications, and provides a PRACH repeated transmission method, an apparatus, a system, and a computer-readable storage medium, the method including: configuring a first PRACH transmission resource and a second PRACH transmission resource, the first PRACH transmission resource being only used for PRACH single transmissions, and the second PRACH transmission resource being only used for PRACH repeated transmissions.

19 Claims, 4 Drawing Sheets

(56) References Cited

U.S. PATENT DOCUMENTS

| | | | | |
|---|---|---|---|---|
| 2020/0267770 | A1 | 8/2020 | Islam et al. | |
| 2021/0037577 | A1 | 2/2021 | Lei et al. | |
| 2021/0176018 | A1 | 6/2021 | Bai et al. | |
| 2023/0062230 | A1 | 3/2023 | He | |
| 2025/0331029 | A1* | 10/2025 | Lei | H04W 74/006 |

FOREIGN PATENT DOCUMENTS

| | | | |
|---|---|---|---|
| CN | 110999392 | A | 4/2020 |
| CN | 113303023 | A | 8/2021 |
| CN | 114175565 | A | 3/2022 |
| JP | 2016219892 | A | 12/2016 |
| WO | 2017133635 | A1 | 8/2017 |
| WO | 2021087978 | A1 | 5/2021 |
| WO | 2021207925 | A1 | 10/2021 |
| WO | 2024009403 | A1 | 1/2024 |

OTHER PUBLICATIONS

CATT, "PRACH design and UL timing management", 3GPP TSG RAN WG1 Meeting #98bis R1-1910338 Chongqing, China, Oct. 14-20, 2019, 10 Pages.

Chinese Office Action dated Apr. 25, 2024 in CN Application No. 202211101995.1, 24 Pages.

Decision to Grant a Patent issued Oct. 28, 2024 in CN Application No. 202211101995.1, 5 pages.

Japanese Office Action dated Feb. 27, 2026 in JP Application No. 2025-514626, 8 Pages.

NTT DOCOMO, "Views on PRACH repetition in Rel-13 low complexity UE," 3GPP TSG RAN WG1 Meeting #83 Anaheim, USA, R1-157348, Nov. 15-22, 2015. 4 Pages.

Japanese Office Action dated Jun. 1, 2026 in JP Application No. 2025-514626, 4 Pages.

* cited by examiner

METHOD, APPARATUS, AND SYSTEM OF PRACH TRANSMISSION WITH REPETITION, AND COMPUTER-READABLE STORAGE MEDIUM

CROSS-REFERENCE TO RELATED APPLICATIONS

The present application is a U.S. National Stage Application under 35 U.S.C. $ 371 of International Patent Application No. PCT/CN2019/114285, filed on Oct. 30, 2019, which is based on and claims priority to China Patent Application No. 202211101995.1 filed on Sep. 9, 2022, the disclosure of both of which are incorporated by reference herein in their entireties.

TECHNICAL FIELD

The present disclosure relates to a method, apparatus, and system of Physical Random Access Channel (PRACH) transmission with repetition, and a computer-readable storage medium.

BACKGROUND

3GPP NR Realease-17 protocol does not support PRACH transmission with repetition. According to a current protocol version, the User Equipment (UE) calculates a Random Access-Radio Network Temporary Identifier (RA-RNTI) according to a PRACH transmission occasion for sending a preamble and monitors a Physical Downlink Control Channel (PDC) in a time window of Random Access Response (RAR). If the monitored Downlink Control Information (DCI) is successfully descrambled by using the RA-RNTI, and a Random Access Preamble Identifier (RAPID) corresponding to a preamble sent by the UE is received according to the scheduling of the DCI, it is proved that the PRACH transmission is successful; and if it is not successful, the UE needs to perform PRACH transmission again, which will not only lead to additional delay, but also wastes the PRACH transmission resources.

SUMMARY

According to one aspect of the embodiment of the present disclosure, a method of PRACH transmission with repetition is provided. The method is applied to a network side and comprises: configuring a first PRACH transmission resource and a second PRACH transmission resource, the first PRACH transmission resource being only used for PRACH transmission without repetition, and the second PRACH transmission resource being only used for PRACH transmission with repetition.

In some embodiments, configuring the second PRACH transmission resource comprises: configuring a set of candidate repetition numbers for PRACH transmission with repetition supported by a network side.

In some embodiments, configuring the second PRACH transmission resource further comprises: configuring at least one of a first parameter or a second parameter, the first parameter being used for indicating an associated relationship between each candidate repetition number for PRACH transmission with repetition and a preamble, and the second parameter being used for indicating a first group of PRACH transmission occasions corresponding to each of at least some candidate repetition numbers for PRACH transmission with repetition.

In some embodiments, the at least some candidate repetition numbers for PRACH transmission with repetition comprise each candidate repetition number for PRACH transmission with repetition except for a maximum candidate repetition number for PRACH transmission with repetition.

In some embodiments, different candidate repetition numbers for PRACH transmission with repetition are associated with different preambles.

In some embodiments, wherein configuring the second PRACH transmission resource further comprises: configuring a third parameter, the third parameter being used for indicating an associated relationship between each SSB index and a preamble.

In some embodiments, the first parameter is configured according to the third parameter, each SSB index is associated with M preambles, and the set of candidate repetition numbers for PRACH transmission with repetition has Q candidate repetition numbers for PRACH transmission with repetition, where $P=\lfloor M/Q \rfloor$, M mod Q=K, and K candidate repetition numbers for PRACH transmission with repetition in the set of candidate repetition numbers for PRACH transmission with repetition are associated with P+1 preambles, and other candidate repetition numbers for PRACH transmission with repetition than the K candidate repetition numbers for PRACH transmission with repetition in the set of candidate repetition numbers for PRACH transmission with repetition are associated with P preambles, where M and Q are both greater than or equal to 1.

In some embodiments, the second parameter comprises a bit sequence corresponding to each candidate repetition number for PRACH transmission with repetition, a sequence length of the bit sequence is equal to a maximum candidate repetition number for PRACH transmission with repetition in the set of candidate repetition numbers for PRACH transmission with repetition, each bit in the bit sequence corresponds to one PRACH transmission occasion, and a value of each bit in the bit sequence indicates whether a corresponding PRACH transmission occasion is used for transmission with repetition.

In some embodiments, when the value is 1, it means that the corresponding PRACH transmission occasion is used for transmission with repetition; and when the value is 0, it means that the corresponding PRACH transmission occasion is not used for transmission with repetition.

In some embodiments, configuring the second PRACH transmission resource further comprises: configuring a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate repetition numbers for PRACH transmission with repetition among the plurality of PRACH transmission occasions associated with each SSB index.

In some embodiments, the method further comprises: performing detection on at least some PRACH transmission occasions in the second PRACH transmission resource to obtain a first preamble transmitted with repetition by a user equipment (UE); determining a random access radio network temporary identifier (RA-RNTI) according to one PRACH transmission occasion of the at least some PRACH transmission occasions; scrambling a first downlink control information (DCI) by using the RA-RNTI to obtain a second DCI; and sending the second DCI and a random access response (RAR) scheduled by the second DCI, wherein the RAR carries a random access preamble identifier (RAPID) of the first preamble.

In some embodiments, configuring the second PRACH transmission resource further comprises: configuring a second parameter, the second parameter being used for indicating a first group of PRACH transmission occasions corresponding to each of at least some candidate repetition numbers for PRACH transmission with repetition, wherein the at least some PRACH transmission occasions comprise the first group of PRACH transmission occasions.

In some embodiments, configuring the second PRACH transmission resource further comprises: configuring a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate repetition numbers for PRACH transmission with repetition among the plurality of PRACH transmission occasions associated with each SSB index, wherein the at least some PRACH transmission occasions comprise the second group of PRACH transmission occasions.

In some embodiments, there is an i such that an i-th PRACH transmission occasion differs in different second group of PRACH transmission occasions in the first group of PRACH transmission occasions, and the one PRACH transmission occasion is the i-th PRACH transmission occasion.

In some embodiments, the plurality of PRACH transmission occasions associated with each SSB index do not overlap with each other in a time domain.

In some embodiments, the plurality of PRACH transmission occasions associated with each SSB index are successively arranged in the time domain.

In some embodiments, a maximum candidate repetition number for PRACH transmission with repetition in the set of candidate repetition numbers for PRACH transmission with repetition does not exceed a number of the plurality of PRACH transmission occasions associated with each SSB index.

According to another aspect of the embodiments of the present disclosure, provided is a method of PRACH transmission with repetition, which is applied to a network side, comprising: sending a configuration information, the configuration information indicating a first PRACH transmission resource only for PRACH transmission without repetition and a second PRACH transmission resource only for PRACH transmission with repetition.

According to still another aspect of the embodiments of the present disclosure, provided is a method of PRACH transmission with repetition, which is applied to a UE, comprising: receiving a configuration information, the configuration information indicating a first PRACH transmission resource only for PRACH transmission without repetition and a second PRACH transmission resource only for PRACH transmission with repetition; and transmitting a preamble according to the configuration information.

In some embodiments, the configuration information further comprises a set of candidate repetition numbers for PRACH transmission with repetition supported by a network side; and transmitting the preamble according to the configuration information comprises: determining a repetition number m for PRACH transmission with repetition in the set of candidate repetition numbers for PRACH transmission with repetition, and transmitting a first preamble with repetition for m times by using the second PRACH transmission resource.

In some embodiments, the configuration information further comprises at least one of a first parameter or a second parameter, the first parameter being used for indicating an associated relationship between each candidate repetition number for PRACH transmission with repetition and a preamble, and the second parameter being used for indicating a first group of PRACH transmission occasions corresponding to each of at least some candidate repetition numbers for PRACH transmission with repetition; and transmitting the first preamble with repetition for m times by using the second PRACH transmission resource comprises: determining the first group of PRACH transmission occasions corresponding to the repetition number m for PRACH transmission with repetition according to the second parameter, in a case where the configuration information comprises the second parameter, and transmitting the first preamble with repetition for m times at the first group of PRACH transmission occasions corresponding to the repetition number m for PRACH transmission with repetition, wherein the first preamble belongs to a preamble associated with the repetition number m for PRACH transmission with repetition, in a case where the configuration information comprises the first parameter.

In some embodiments, the at least some candidate repetition numbers for PRACH transmission with repetition comprise each candidate repetition number for PRACH transmission with repetition except for a maximum candidate repetition number for PRACH transmission with repetition.

In some embodiments, the configuration information further comprises a third parameter, the third parameter being used for indicating an associated relationship between each SSB index and a preamble, wherein the first preamble belongs to a preamble associated with an SSB index selected by the UE.

In some embodiments, the first parameter is configured according to the third parameter, each SSB index is associated with M preambles, and the set of candidate repetition numbers for PRACH transmission with repetition has Q candidate repetition numbers for PRACH transmission with repetition, where $P=\lfloor M/Q \rfloor$, M mod Q=K, wherein K candidate repetition numbers for PRACH transmission with repetition in the set of candidate repetition numbers for PRACH transmission with repetition are associated with P+1 preambles, and other candidate repetition numbers for PRACH transmission with repetition than the K candidate repetition numbers for PRACH transmission with repetition in the set of candidate repetition numbers for PRACH transmission with repetition are associated with P preambles, where M and Q are both greater than or equal to 1; and the first preamble belongs to a preamble associated with the repetition number for PRACH transmission with repetition among M preambles associated with the SSB index selected by the UE.

In some embodiments, the second parameter comprises a bit sequence corresponding to each candidate repetition number for PRACH transmission with repetition, a sequence length of the bit sequence is equal to a maximum candidate repetition number for PRACH transmission with repetition in the set of candidate repetition numbers for PRACH transmission with repetition, each bit in the bit sequence corresponds to one PRACH transmission occasion, and a value of each bit in the bit sequence indicates whether a corresponding PRACH transmission occasion is used for transmission with repetition.

In some embodiments, when the value is 1, it means that the corresponding PRACH transmission occasion is used for transmission with repetition; and when the value is 0, it means that the corresponding PRACH transmission occasion is not used for transmission with repetition.

In some embodiments, the configuration information further comprises a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate repetition numbers for PRACH transmission with repetition among the plurality of PRACH transmission occasions associated with each SSB index; and transmitting the first preamble with repetition for m times at the first group of PRACH transmission occasions corresponding to the repetition number m for PRACH transmission with repetition comprises: transmitting the first preamble with repetition for m times at the second group of PRACH transmission occasions corresponding to the repetition number m for PRACH transmission with repetition among the plurality of PRACH transmission occasions associated with an SSB index selected by the UE.

In some embodiments, the plurality of PRACH transmission occasions associated with each SSB index do not overlap with each other in a time domain.

In some embodiments, the plurality of PRACH transmission occasions associated with each SSB index are successively arranged in the time domain.

In some embodiments, a maximum candidate repetition number for PRACH transmission with repetition in the set of candidate repetition numbers for PRACH transmission with repetition does not exceed a number of the plurality of PRACH transmission occasions associated with each SSB index.

In some embodiments, the method further comprises: receiving a second DCI; determining a RA-RNTI according to one PRACH transmission occasion among the first group of PRACH transmission occasions corresponding to the repetition number m for PRACH transmission with repetition; descrambling the second DCI by using the RA-RNTI to obtain a first DCI; and receiving a RAR according to the first DCI.

In some embodiments, the configuration information further comprises a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate repetition numbers for PRACH transmission with repetition among the plurality of PRACH transmission occasions associated with each SSB index; and the one PRACH transmission occasion belongs to a second group of PRACH transmission occasions corresponding to the repetition number m for PRACH transmission with repetition among the plurality of PRACH transmission occasions associated with an SSB index selected by the UE.

In some embodiments, there is an i such that an i-th PRACH transmission occasion differs in different second group of PRACH transmission occasions in the first group of PRACH transmission occasions, and the one PRACH transmission occasion is the i-th PRACH transmission occasion.

In some embodiments, the method further comprises: performing a subsequent random access procedure in a case where the RAR carries a RAPID of the first preamble.

According to yet another aspect of the embodiments of the present disclosure, provided is an apparatus of PRACH transmission with repetition, which is applied to a network side, comprising: a configuration module configured to configure a first PRACH transmission resource and a second PRACH transmission resource, the first PRACH transmission resource being only used for PRACH transmission without repetition, and the second PRACH transmission resource being only used for PRACH transmission with repetition.

According to further aspect of the embodiments of the present disclosure, provided is an apparatus of PRACH transmission with repetition, which is applied to a network side, comprising: a memory; and a processor coupled to the memory, and configured to, based on instructions stored in the memory, perform the method of PRACH transmission with repetition according to any of the above embodiments.

According to further aspect of the embodiments of the present disclosure, provided is an apparatus of PRACH transmission with repetition, which is applied to a UE, comprising: a receiving module configured to receive a configuration information indicating a first PRACH transmission resource only for PRACH transmission without repetition and a second PRACH transmission resource only for PRACH transmission with repetition; and a transmission module configured to transmit a preamble according to the configuration information.

According to another aspect of the embodiments of the present disclosure, provided is an apparatus of PRACH transmission with repetition, which is applied to a UE, comprising: a memory; and a processor coupled to the memory, and configured to, based on instructions stored in the memory, perform the method of PRACH transmission with repetition according to any of the above embodiments.

According to further aspect of the embodiments of the present disclosure, provided is a base station, comprising: the apparatus of PRACH transmission with repetition according to any of the above embodiments.

According to further aspect of the embodiments of the present disclosure, provided is a user equipment, comprising: the apparatus of PRACH transmission with repetition according to any of the above embodiments.

According to further aspect of the embodiments of the present disclosure, provided is a system of PRACH transmission with repetition, comprising: the base station according to any of the above embodiments.

According to further aspect of the embodiments of the present disclosure, provided is a computer readable storage medium, comprising computer program instructions, wherein the computer program instructions, when executed by a processor, implement the method of PRACH transmission with repetition according to any of the above embodiments.

According to further aspect of the embodiments of the present disclosure, provided is a computer program product, comprising a computer program, wherein the computer program, when executed by a processor, implements the method of PRACH transmission with repetition according to any of the above embodiments.

The technical solutions of the present disclosure will be further described in detail below by way of the accompanying drawings and embodiments.

BRIEF DESCRIPTION OF THE DRAWINGS

In order to more explicitly explain the technical solutions in the embodiments of the present disclosure or the prior art, the accompanying drawings required to be used in the description of the embodiments or the prior art will be briefly introduced below. Obviously, the accompanying drawings described below are merely some of the embodiments of the present disclosure. For those of ordinary skill in the art, other accompanying drawings may also be obtained according to these accompanying drawings on the premise that no inventive effort is involved.

DETAILED DESCRIPTION

Figure 1:
FIG. 1 is a schematic flowchart of a method of PRACH transmission with repetition according to some embodiments of the present disclosure.

The technical solutions in the embodiments of the present disclosure will be explicitly and completely described below in conjunction with the accompanying drawings in the embodiments of the present disclosure. Apparently, the embodiments described are merely some of the embodiments of the present disclosure, rather than all of the embodiments. The following description of at least one exemplary embodiment is in fact merely illustrative and shall by no means serve as any limitation to the present disclosure as well as its application or use. On the basis of the embodiments of the present disclosure, all the other embodiments obtained by those of ordinary skill in the art on the premise that no inventive effort is involved shall fall into the protection scope of the present disclosure.

The relative arrangements, numerical expressions and numerical values of the components and steps elaborated in these examples shall not limit the scope of the present invention unless specified otherwise.

At the same time, it should be understood that, for ease of description, the dimensions of various parts shown in the accompanying drawings are not drawn according to actual proportional relations.

The techniques, methods, and devices known to those of ordinary skill in the relevant art might not be discussed in detail. However, the techniques, methods, and devices shall be considered as part of the granted description where appropriate.

Among all the examples shown and discussed here, any specific value shall be construed as being merely exemplary, rather than as a restriction. Thus, other examples in the exemplary embodiments may have different values.

It is to be noted that: similar reference numerals and letters present similar items in the following accompanying drawings, and therefore, once an item is defined in one accompanying drawing, a further discussion thereof is not required in subsequent accompanying drawings.

The inventors have noticed that, to realize PRACH transmission with repetition, the PRACH transmission resources need to be configured for PRACH transmission with repetition. If the existing PRACH transmission resources for PRACH transmission without repetition are multiplexed, this will lead to an increased probability of PRACH transmission conflict.

To solve the above problem, the embodiments of the present disclosure provides the following solutions.

FIG. 1 is a schematic flowchart of a method of PRACH transmission with repetition according to some embodiments of the present disclosure. The method of PRACH transmission with repetition is applied to a network side.

At step 102, a first PRACH transmission resource and a second PRACH transmission resource is configured by the network side. The first PRACH transmission resource is only used for PRACH transmission without repetition. The second PRACH transmission resource is only used for PRACH transmission with repetition.

It may be understood that, since the first PRACH transmission resource is only used for PRACH transmission without repetition and the second PRACH transmission resource is only used for PRACH transmission with repetition, there is no resource overlap between the first PRACH transmission resource and the second PRACH transmission resource. In other words, a first PRACH transmission occasion comprised in the first PRACH transmission resource and a second PRACH transmission occasion comprised in the second PRACH transmission resource do not overlap with each other in at least one of a time domain or a frequency domain. In some embodiments, the first PRACH transmission occasion and the second PRACH transmission occasion do not overlap with each other in the time domain, which is beneficial to improve the probability of successful PRACH transmission, thereby improving the coverage performance of PRACH.

On the basis of ensuring PRACH transmission without repetition and realizing PRACH transmission with repetition, the network side reduces the probability of a resource conflict between PRACH transmission without repetition and PRACH transmission with repetition.

The implementations of configuring the second PRACH transmission resource by the network side will be introduced below in conjunction with different embodiments.

In some embodiments, the step of configuring the second PRACH transmission resource by the network side comprises: configuring a set of candidate repetition numbers for PRACH transmission with repetition supported by the network side. The set of candidate repetition numbers for PRACH transmission with repetition comprises at least one repetition number for PRACH transmission with repetition, for example, only comprising one repetition number for PRACH transmission with repetition or comprising a plurality of repetition numbers for PRACH transmission with repetition.

For example, the network side configures the set of candidate repetition numbers for PRACH transmission with repetition to be {2, 4, 8}. The UE selects one repetition number for PRACH transmission with repetition from the set of candidate repetition numbers for PRACH transmission with repetition configured by the network side for PRACH transmission with repetition. The network side configures the set of candidate repetition numbers for PRACH transmission with repetition so that the UE selects the number for transmitting a preamble with repetition more flexibly according to the requirements to reduce the resource waste.

In some embodiments, the step of configuring the second PRACH transmission resource by the network side further comprises: configuring at least one of a first parameter or a second parameter. The first parameter is used for indicating an associated relationship between each candidate repetition number for PRACH transmission with repetition and a preamble, and the second parameter is used for indicating a first group of PRACH transmission occasions corresponding to each of at least some candidate repetition numbers for PRACH transmission with repetition in the set of candidate repetition numbers for PRACH transmission with repetition.

In a case where the network side configures the first parameter, the UE selects a preamble from the preamble(s) associated with the repetition number for PRACH transmission with repetition selected by the UE according to the first parameter and performs transmission with repetition. Later, the network side may determine the repetition number for PRACH transmission with repetition selected by the UE according to the received preamble, and distinguish a UE performing PRACH transmission without repetition from a UE performing PRACH transmission with repetition, which is helpful to reduce the probability of a resource conflict between the UE performing PRACH transmission without repetition and the UE performing PRACH transmission with repetition.

In some embodiments, different candidate repetition numbers for PRACH transmission with repetition are associated with different preambles. In other words, when the repetition numbers for PRACH transmission with repetition determined by two UEs are different, the transmitted preambles are also different when PRACH transmission with repetition is performed. When performing PRACH detection, the network side may determine the repetition number for PRACH transmission with repetition selected by the UE according to the received preamble, to distinguish UEs selecting different repetition numbers for PRACH transmission with repetition. The above method may avoid that the UEs selecting different candidate repetition numbers for PRACH transmission with repetition transmit the same preamble, thereby avoiding a resource conflict between the UEs selecting different repetition numbers for PRACH transmission with repetition.

In a case where the network side configures the second parameter, the UE determines the first group of PRACH transmission occasions associated with the repetition number for PRACH transmission with repetition selected by the UE according to the second parameter. Later, when performing PRACH detection, the network side performs PRACH detection group by group for each first group of PRACH transmission occasions, which can avoid missing a PRACH transmission occasion and improve the probability of detecting a preamble transmitted by the UE. In addition, the network side may determine whether the UE performs PRACH transmission with repetition according to the PRACH transmission occasion of the received preamble, and distinguish a UE performing PRACH transmission without repetition from a UE performing PRACH transmission with repetition, which is helpful to reduce the probability of a resource conflict between the UE performing PRACH transmission with repetition and the UE performing PRACH transmission without repetition.

In some embodiments, the step of configuring the second PRACH transmission resource by the network side further comprises: configuring a third parameter. The third parameter is used for indicating an associated relationship between each SSB index and a preamble.

According to the third parameter, the network side determines the SSB index selected by the UE, and further determines the beam with an optimum transmission quality selected by the UE. Transmitting the information required by a subsequent random access procedure in the beam direction facilitates the information of receiving by the UE and improves the probability of receiving the information by the UE.

In some embodiments, the first parameter is configured according to the third parameter. Specifically, each SSB index is associated with M preambles, and the set of candidate repetition numbers for PRACH transmission with repetition has Q candidate repetition numbers for PRACH transmission with repetition, where $P=\lfloor M/Q \rfloor$, M mod Q=K. K candidate repetition numbers for PRACH transmission with repetition in the set of candidate repetition numbers for PRACH transmission with repetition are associated with P+1 preambles, and other candidate repetition numbers for PRACH transmission with repetition than the K candidate repetition numbers for PRACH transmission with repetition in the set of candidate repetition numbers for PRACH transmission with repetition are associated with P preambles, where M and Q are both greater than or equal to 1.

It may be understood that, in the above method, the network side allocates P preambles averagely to each candidate repetition number for PRACH transmission with repetition, and when the remaining K preambles are insufficient to support single average allocation, K candidate repetition numbers for PRACH transmission with repetition are selected from the candidate repetition numbers for PRACH transmission with repetition, and one more preamble is allocated to each of the selected K candidate repetition numbers for PRACH transmission with repetition.

By way of the above method, when performing PRACH detection later, the network side determines two items of information comprising an SSB index selected by the UE and a repetition number for PRACH transmission with repetition selected by the UE according to the received preamble. For the UEs selecting different SSB indices, the network side transmits the information required for a subsequent random access procedure in the beam direction corresponding to an SSB index selected by UE, so as to avoid a resource conflict between the UEs selecting different SSB indices. Even if different UEs select the same SSB index, if the selected repetition numbers for PRACH transmission with repetition are different, the network side can also distinguish the UEs selecting different repetition numbers for PRACH transmission with repetition according to the received preambles, which avoids a resource conflict between the UEs selecting different repetition numbers for PRACH transmission with repetition.

For example, M=16, the set of candidate repetition numbers for PRACH transmission with repetition is {2, 4, 8}, and Q=3. In this case, $P=\lfloor 16/3 \rfloor=5$, and M mod Q=1. At this time, the network side associates the candidate repetition number 2 for PRACH transmission with repetition with 6 preambles and associates the candidate repetition numbers 4 and 8 for PRACH transmission with repetition with 5 preambles respectively.

For another example, M=16, the set of candidate repetition numbers for PRACH transmission with repetition is {2, 4}, and Q=2. In this case, $P=\lfloor 16/2 \rfloor=8$ and M mod Q=0. At this time, the network side associates 8 preambles for each candidate repetition number for PRACH transmission with repetition.

In some embodiments, the second parameter comprises a bit sequence corresponding to each candidate repetition number for PRACH transmission with repetition. The bit sequence has a sequence length equal to a maximum candidate repetition number for PRACH transmission with repetition in the set of candidate repetition numbers for PRACH transmission with repetition. Each bit in the bit sequence corresponds to one PRACH transmission occasion, and the value of each bit in the bit sequence indicates whether a corresponding PRACH transmission occasion is used for transmission with repetition.

For example, the set of candidate repetition numbers for PRACH transmission with repetition is {2, 4}. In this case, the second parameter comprises two bit sequences corresponding to the candidate repetition numbers 2 and 4 for PRACH transmission with repetition respectively.

In a case where the second parameter is configured in the form of the bit sequence, the bit sequence corresponding to each candidate repetition number for PRACH transmission with repetition has the same sequence length. For each bit in the bit sequence, whether to use a PRACH transmission occasion corresponding to the bit number is configured by changing the bit value. The above method can facilitate the network side to configure the PRACH transmission occasions corresponding to different candidate PRACH repetition numbers, which simplifies the configuration method and improves the configuration efficiency. In some implementations, when the bit value of a certain bit in the bit sequence is 1, it means that a corresponding PRACH transmission occasion is used for transmission with repetition; and when the value is 0, it means that a corresponding PRACH transmission occasion is not used for transmission with repetition. For example, when the bit sequence "1001" indicates that the repetition number for PRACH transmission with repetition is 2, the UE uses PRACH transmission occasions corresponding to the first bit and fourth bit of the bit sequence for transmitting a preamble with repetition.

In some embodiments, the step of configuring the second PRACH transmission resource further comprises: configuring a fourth parameter. The fourth parameter is used for indicating an associated relationship between each SSB index and a plurality of PRACH transmission occasions. Here, the first group of PRACH transmission occasions comprise the second group of PRACH transmission occasions corresponding to each candidate repetition number for PRACH transmission with repetition among PRACH transmission occasions associated with each SSB index. For example, the set of candidate repetition numbers for PRACH transmission with repetition is configured to be {2}, and the first group of PRACH transmission occasions associated with the candidate repetition number 2 for PRACH transmission with repetition comprise PRACH transmission occasions #1, #2, #3 and #4; and the network side configures two SSB indices, which are SSB #0 and SSB #1 respectively. The first group of PRACH transmission occasions comprise the second group of PRACH transmission occasions #1 and #2 associated with the SSB #0 (SSB index) and the second group of PRACH transmission occasions #3 and #4 associated with SSB #1.

In some embodiments, at least two SSB indices are associated with the same plurality of PRACH transmission occasions. In some embodiments, at least two SSB indices are associated with different plurality of PRACH transmission occasions.

When performing PRACH detection, the network side determines an SSB index selected by the UE through the associated relationship between an SSB index and a plurality of PRACH transmission occasions, further determines the beam with an optimum transmission quality selected by the UE, and transmits the information required by a subsequent random access procedure in the beam direction so as to facilitate the information of receiving by the UE.

In some embodiments, the maximum candidate repetition number for PRACH transmission with repetition in the set of candidate repetition numbers for PRACH transmission with repetition does not exceed the number of PRACH transmission occasions associated with each SSB index.

In some implementations, the fourth parameter comprises a preset value N. When N≥1, it means that one PRACH transmission occasion is associated with N SSB indices; and when N≤1, it means that one SSB is associated with 1/N second PRACH transmission occasions. For example, the value of N comprises one or more of the following: {1/16, 1/8, 1/4, 1/2, 1, 2, 4, 8, 16, 32}.

In some embodiments, the third parameter is related to the fourth parameter. Since the total number of preambles that can be used in each cell is 64, limited by the total number of preambles, when N≤1, m≤64; and when N≥1, M×N≤64 is satisfied. In some embodiments, the network side configures one or more of the first parameter, the second parameter, the third parameter and the fourth parameter mentioned above.

The implementations of configuring the fourth parameter by the network side will be introduced below in conjunction with different embodiments.

In some embodiments, in an association period between an SSB index and a PRACH transmission occasion, if the total number of PRACH transmission occasions is x, the total number of SSB indices is 1, and the number of PRACH transmission occasions associated with the same SSB index is y, then $y=\lfloor Nx/1 \rfloor$.

The implementations of the associated relationship between an SSB index and a plurality of PRACH transmission occasions configured by the network side will be described below in conjunction with FIGS. 2, 3 and 4.

Figure 2:
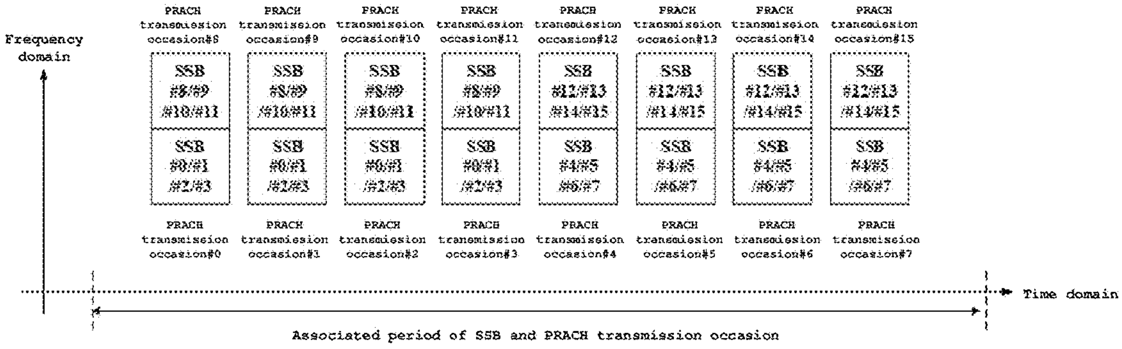
FIG. 2 is a schematic view showing an associated relationship between an SSB index and a PRACH transmission occasion according to some embodiments of the present disclosure.

FIG. 2 is a schematic view showing an associated relationship between an SSB index and a PRACH transmission occasion according to some embodiments of the present disclosure.

As shown in FIG. 2, in an association period between an SSB and a PRACH transmission occasion, the total number 1 of SSB indices (which are SSB #0~SSB #15 respectively) is 1=16; the total number X of PRACH transmission occasions (which are PRACH transmission occasions #0~#15 respectively) is x=16. N=4, and y=4.

N SSB indices are divided into one group according to an ascending order of SSB index serial numbers, and 16 SSBs may be divided into 4 groups. Each group of SSB indices is associated with 4 PRACH transmission occasions. For example, SSB #0~SSB #3 are associated with PRACH transmission occasions #0~#3; SSB #4~SSB #7 are associated with PRACH transmission occasions #4~#7; SSB #8~SSB #11 are associated with PRACH transmission occasions #8~#11; SSB #12 to SSB #15 are associated with PRACH transmission occasions #12~#15.

In some implementations, the network side configures both the second parameter and the fourth parameter.

For example, the set of candidate repetition numbers for PRACH transmission with repetition configured by the network side is {2, 4}. The network side configures the second parameter "1001" for the candidate repetition number 2 for PRACH transmission with repetition and configures the second parameter "1111" for the candidate repetition number 4 for PRACH transmission with repetition. Moreover, the associated relationship between an SSB index and a plurality of PRACH transmission occasions is configured shown in FIG. 2.

When a UE selects SSB #0 and determines that the repetition number for PRACH transmission with repetition is 2, according to the second parameter "1001" and the associated relationship shown in FIG. 2, in the PRACH transmission occasions #0~#3, the UE selects the PRACH transmission occasion #0 corresponding to the first bit and the PRACH transmission occasion #3 corresponding to the fourth bit in the bit sequence for transmitting a preamble with repetition. During a subsequent PRACH detection process, the network side detects the preamble at the PRACH transmission occasions #0 and #3 according to the second parameter.

When the UE selects SSB #0 and determines that the repetition number for PRACH transmission with repetition is 4, the UE transmits a preamble with repetition at the PRACH transmission occasions #0~#3, and the network side performs PRACH detection at the PRACH transmission occasions #0~#3.

For another example, the set of candidate repetition numbers for PRACH transmission with repetition configured by the network side is {2, 4}. The network side configures the second parameter "1010" for the candidate repetition number 2 for PRACH transmission with repetition and configures the second parameter "1111" for the candidate repetition number 4 for PRACH transmission with repetition. Moreover, the associated relationship between an SSB index and a plurality of PRACH transmission occasions is configured shown in FIG. 2.

When the UE selects SSB #8 and determines that the repetition number for PRACH transmission with repetition is 2, according to the second parameter "1010" and the associated relationship shown in FIG. 2, in the PRACH transmission occasions #8 to #11, the UE selects the PRACH transmission occasion #8 corresponding to the first bit and the PRACH transmission occasion #10 corresponding to the third bit in the bit sequence for transmitting a preamble with repetition. During a subsequent PRACH detection process, the network side detects the preamble at the PRACH transmission occasions #8 and #10 according to the second parameter.

Figure 3:
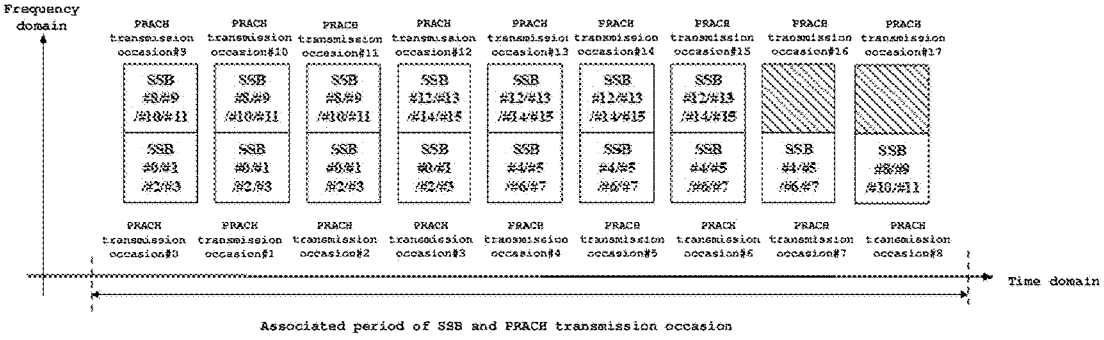
FIG. 3 is a schematic view showing an associated relationship between an SSB index and a PRACH transmission occasion according to other embodiments of the present disclosure.

FIG. 3 is a schematic view showing an associated relationship between an SSB index and a PRACH transmission occasion according to other embodiments of the present disclosure.

Figure 4:
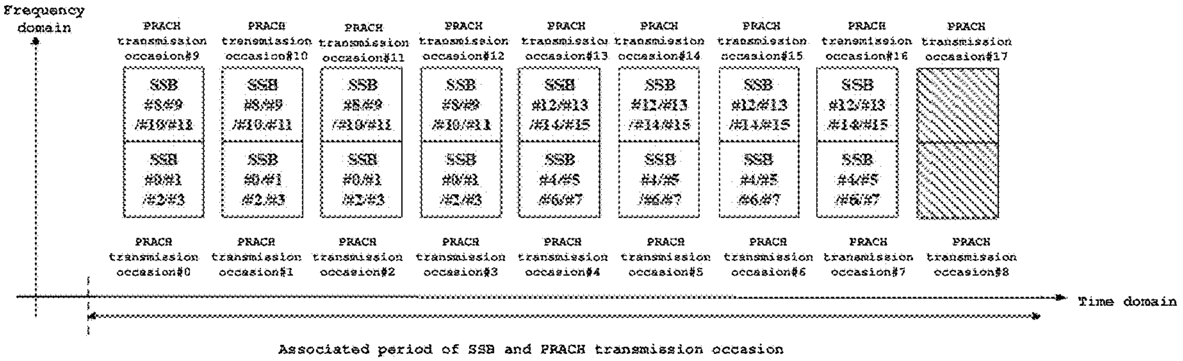
FIG. 4 is a schematic view showing an associated relationship between an SSB index and a PRACH transmission occasion according to yet other embodiments of the present disclosure.

FIG. 4 is a schematic view showing an associated relationship between an SSB index and a PRACH transmission occasion according to yet other embodiments of the present disclosure.

As shown in FIG. 3 or FIG. 4, in an association period between an SSB and a PRACH transmission occasion, the total number 1 of SSB indices (which are SSB #0~SSB #15 respectively) is 1=16; the total number of PRACH transmission occasions (which are PRACH transmission occasions #0~#18 respectively) is x=18. N=4, and y=4.

N SSB indices are divided into one group according to an ascending order of SSB index serial numbers, and 16 SSBs may be divided into 4 groups. Each group of SSB indices is associated with 4 PRACH transmission occasions, and there are 2 remaining PRACH transmission occasions.

In some implementations, as shown in FIG. 3, SSB #0~SSB #3 are associated with PRACH transmission occasions #0~#3; SSB #4~SSB #7 are associated with PRACH transmission occasions #4~#7; SSB #8~SSB #11 are associated with PRACH transmission occasions #8~#11; SSB #12 to SSB #15 are associated with PRACH transmission occasions #12~#15, and PRACH transmission occasions #16 and #17 are remained.

In other implementations, as shown in FIG. 4, SSB #0~SSB #3 are associated with PRACH transmission occasions #0~#3; SSB #4~SSB #7 are associated with PRACH transmission occasions #4~#7; SSB #8~SSB #11 are associated with PRACH transmission occasions #9~#12; SSB #12 to SSB #15 are associated with PRACH transmission occasions #13~#16, and PRACH transmission occasions #8 and #17 are remained.

In some embodiments, the remaining PRACH transmission occasions are not used for PRACH transmission with repetition.

In some embodiments, the at least some candidate repetition numbers for PRACH transmission with repetition indicated by the second parameter comprises each candidate repetition number for PRACH transmission with repetition except for a maximum candidate repetition number for PRACH transmission with repetition. In other words, the second parameter may only indicate some candidate repetition numbers for PRACH transmission with repetition except for the maximum candidate repetition number for PRACH transmission with repetition. For the maximum candidate repetition number for PRACH transmission with repetition, the network side does not configure the second parameter. For example, when each SSB is associated with four PRACH transmission occasions and the set of candidate repetition numbers for PRACH transmission with repetition is {2, 4}, for the candidate repetition number 4 for PRACH transmission with repetition, the network side does not configure the second parameter. If the UE chooses to transmit a preamble with repetition for 4 times, the preamble will be repeatedly transmitted at each PRACH transmission occasion associated with an SSB index selected by the UE by default. The network side does not configure the second parameter for the maximum candidate repetition number for PRACH transmission with repetition, which can save the configuration resource and time, and improve the configuration efficiency.

Figure 5:
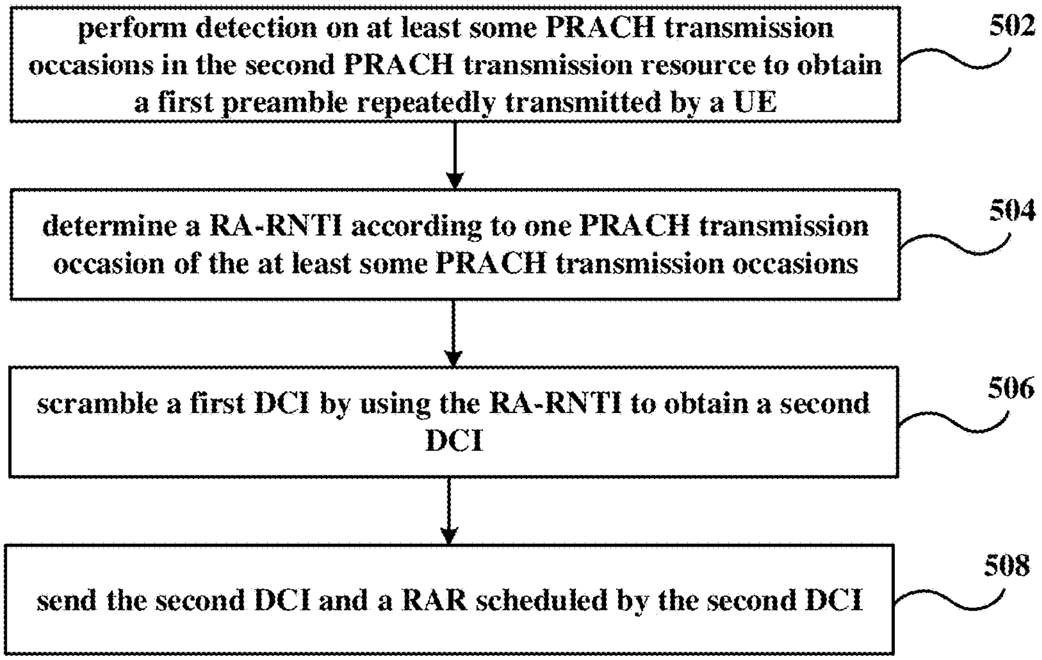
FIG. 5 is a schematic flowchart of PRACH detection performed by a network side according to some embodiments of the present disclosure.

FIG. 5 is a schematic flowchart of PRACH detection performed by a network side according to some embodiments of the present disclosure.

In some embodiments, the network side also performs the following steps 502 to 508 shown in FIG. 5.

At step 502, detection is performed on at least some PRACH transmission occasions in the second PRACH transmission resource to obtain a first preamble transmitted with repetition by the UE.

At step 504, a RA-RNTI is determined according to one PRACH transmission occasion of the at least some PRACH transmission occasions.

At step 506, a first DCI is scrambled by using the RA-RNTI to obtain a second DCI.

At step 508, the second DCI and a RAR scheduled by the second DCI are sent, and the RAR carries a RAPID of the first preamble.

In this way, the network side can ensure that the UE performing PRACH transmission without repetition cannot descramble the DCI corresponding to the UE transmitting the first preamble, thereby reducing the possibility of a resource conflict between the UE performing PRACH transmission without repetition and the UE performing PRACH transmission with repetition.

In some embodiments, the network side and the UE agree to select a group of PRACH transmission occasions from a plurality of PRACH transmission occasions associated with an SSB index selected by the UE in a forward or reversed sequence. For example, the plurality of PRACH transmission occasions associated with the SSB indices are shown in FIG. 2. The network side and the UE agree to select some PRACH transmission occasions in a reversed sequence for PRACH transmission with repetition. The UE selects SSB #0 and determines that the repetition number for PRACH transmission with repetition is 2. Then, according to the agreement, the UE transmits a preamble with repetition at PRACH transmission occasions #3 and #2. When detecting the, the network side also performs detection in the reversed sequence. For example, the PRACH occasion #3 is first detected, the PRACH transmission occasions #2 and #3 are then jointly detected, the PRACH transmission occasions #3, #2 and #1 are then jointly detected, and the PRACH transmission occasions #3, #2, #1 and #0 are finally detected.

In other embodiments, in the case where the network side configures the second parameter (for indicating the first group of PRACH transmission occasions corresponding to each of at least some candidate repetition numbers for PRACH transmission with repetition), the at least some PRACH transmission occasions at which the network side performs detection comprise the first group of PRACH transmission occasions. The network side determines a RA-RNTI according to one PRACH transmission occasion among the first group of PRACH transmission occasions. When the repetition number for PRACH transmission selected by UE differs, and the determined RA-RNTI also differs. The above implementation can avoid that the UEs selecting different repetition numbers for PRACH transmission with repetition determine the same RA-RNTI, thereby avoiding a resource conflict between the UEs selecting different repetition numbers for PRACH transmission with repetition and reduce the probability of a resource conflict between different UEs.

In still other embodiments, in the case where the network side configures the second parameter and the fourth parameter (for indicating the associated relationship between each SSB index and a plurality of PRACH transmission occasions), the first group of PRACH transmission occasions comprise a corresponding second group of PRACH transmission occasions among the PRACH transmission occasions associated with each SSB index, and the at least some PRACH transmission occasions at which the network side performs detection comprise the second group of PRACH transmission occasions. The network side determines the RA-RNTI according to one PRACH transmission occasion among the second group of PRACH transmission occasions.

In the above method, even if the UE selects the same SSB index, as long as the repetition number for PRACH transmission with repetition selected by the UE differs, the RA-RNTI determined by the UE differs. Alternatively, although the UE determines the same repetition number for PRACH transmission, when the SSB index selected by the UE differs, the finally determined RA-RNTI differs. The above implementations can avoid that the UEs selecting the same SSB index or the same repetition number for PRACH transmission with repetition determine the same RA-RNTI, thereby further reducing the probability of a resource conflict between different UEs.

In some embodiments, to facilitate the network side and the UE to determine the same RA-RNTI value, the PRACH transmission occasion at which the UE transmits a preamble for the last time is determined as a basis for calculating the RA-RNTI. The inventors have noticed that, among a plurality of PRACH transmission occasions associated with the same SSB index, the first group of PRACH transmission occasions associated with each candidate repetition number for PRACH transmission with repetition of might multiplex the same PRACH transmission occasion. If the basis for calculating the RA-RNTI is determined as the multiplexed PRACH transmission occasion, it might result in that the UEs selecting different repetition numbers for PRACH transmission with repetition determine the same RA-RNTI, which may increase the probability of a resource conflict between the UEs selecting different repetition numbers for PRACH transmission with repetition.

To solve the above problem, the present disclosure provides the following solutions.

In some embodiments, there is an i such that a i-th PRACH transmission occasion differs in different second group of PRACH transmission occasions in the first group of PRACH transmission occasions corresponding to each candidate repetition number for PRACH transmission with repetition. In this case, the one PRACH transmission occasion as a basis for determining the RA-RNTI at step 504 is the i-th PRACH transmission occasion. That is, the network side and UE agree to take the i-th PRACH transmission occasion as the basis for determining the RA-RNTI. For the UE selecting different second group of PRACH transmission occasions, even if the Same preamble is sent, since the i-th PRACH transmission occasion for determining the RA-RNTI differs, the RA-RNTI value also differs. The above implementations can reduce the probability that the UEs selecting a plurality of PRACH transmission occasions associated with the same SSB index determines the same RA-RNTI, thereby reducing the probability of a resource conflict between different UEs.

For example, the associated relationship between an SSB index and a plurality of PRACH transmission with repetition occasions is shown in FIG. 2, and the network side configures the set of candidate repetition numbers for PRACH transmission with repetition to be {2, 3, 4}. The network side configures a second parameter "1001" for the candidate repetition number 2 for PRACH transmission with repetition; configures a second parameter "1011" for the repetition number 3 for PRACH transmission with repetition; and configures a second parameter "1111" for the candidate repetition number 4 for PRACH transmission with repetition.

Among the PRACH transmission occasions #0~#3 associated with SSB #0 selected by UE, the repetition number 2 for PRACH transmission with repetition corresponds to the first second group of PRACH transmission occasions #0, #3, the repetition number 3 for PRACH transmission with repetition corresponds to the second group of PRACH transmission occasions #0, #2, #3, and the repetition number 4 for PRACH transmission with repetition corresponds to the third second group of PRACH transmission occasions #0, #1, #2, #3.

For each of the above second group of PRACH transmission with repetition occasions, the second PRACH transmission occasion is different. The second PRACH transmission occasion of the first second group of PRACH transmission occasions is #3; the second PRACH transmission occasion of the second group of PRACH transmission occasions is #2; and the second PRACH transmission occasion of the third second group of PRACH transmission occasions is #1. The UE and the network side agree to take the second PRACH transmission occasion as the basis for determining the RA-RNTI.

In some embodiments, the network side and the UE agree on a sequence of a plurality of PRACH transmission occasions in the second group of PRACH transmission occasions, to ensure that the i-th PRACH transmission occasion determined by the network side and the i-th transmission occasion determined by the UE side are the same. For example, the network side and the UE agree to arrange a second group of PRACH transmission occasions with the same frequency domain according to an ascending sequence of the time domain, or arrange a second group of PRACH transmission occasions with the same time domain according to an ascending sequence of the frequency domain. For another example, the network side and the UE agree to first arrange PRACH transmission occasions with the smallest frequency domain according to an ascending sequence of the time domain, and then arrange PRACH transmission occasions with the second smallest frequency domain according to an ascending sequence of the time domain, and so forth, to sequence all the PRACH transmission occasions in the second group of PRACH transmission occasions.

In some embodiments, a plurality of PRACH transmission occasions associated with each SSB index do not overlap with each other in the time domain. When PRACH transmission is performed in different frequency domains of the same time domain, since frequency division may reduce the transmission power in each frequency domain, it is not conducive to detecting a preamble by the network side. However, the transmission power will not be reduced by transmitting a preamble with repetition in the time domain, and the probability that the preamble is detected is increased. Therefore, the network side configures the plurality of PRACH transmission occasions associated with the same SSB index to not overlap with each other in the time domain, which is conducive to improving the probability of successful PRACH transmission and thereby improving the coverage performance of PRACH.

In some embodiments, the network side configures a plurality of PRACH transmission occasions associated with the same SSB index to not overlap with each other in the time domain and be successively arranged, which will facilitate to perform PRACH detection by the network side. For example, as shown in FIG. 2, PRACH transmission occasions #4, #5, #6 and #7 associated with SSB #5 do not overlap with each other in the time domain and are successively arranged in the time domain.

In some embodiments, the network side also sends a configuration information. The configuration information is used for indicating a first PRACH transmission resource only for PRACH transmission without repetition and a second PRACH transmission resource only for PRACH transmission with repetition.

The network side informs the UE of a configuration condition of the first PRACH transmission resource and the second PRACH transmission resource by sending the configuration information, so that the UE may select any PRACH transmission resource to realize PRACH transmission according to the configuration information.

In some embodiments, any configuration condition of the second PRACH transmission resource by the network side mentioned above may be carried in the configuration information.

In some embodiments, the network side configures the first PRACH transmission resource for PRACH transmission without repetition. The PRACH configuration information related to the first PRACH transmission resource is indicated by the prach-ConfigurationIndex of the System Information Block (SIB) 1, and the value of this parameter is an index value of 0~255 corresponding to a row index in a random access configuration table. Specifically, the following information is indicated: a preamble format, a system frame number, a sub-frame number, an initial Orthogonal Frequency Division Multiplexing (OFDM) symbol position, the number of time slots for transmitting PRACH in a sub-frame, the number of PRACH time domain transmission occasions in a PRACH time slot and the number of consecutive symbols of PRACH.

For example, one system frame has a length of 10 ms, each system frame comprises 10 sub-frames, each sub-frame has a length of 1 ms, each sub-frame comprises one or more time slots, and each time slot is composed of a plurality of consecutive OFDM symbols.

By way of the above information, the format of a preamble for transmission without repetition, the time domain position of a PRACH transmission occasion for transmission without repetition and the number of PRACH transmission occasions in the time domain may be determined.

In some embodiments, the number of PRACH transmission occasions of the first PRACH transmission resource in the frequency domain may be indicated by a parameter msg1-FDM, which may be configured to be {1, 2, 4, 8}. For example, when this parameter is configured to be 1, it means that there is one PRACH transmission occasion in the frequency domain.

The total number of PRACH transmission occasions of the first PRACH transmission resource may be determined according to the number of PRACH transmission occasions of the first PRACH transmission resource in the time domain and the number of transmission occasions in the frequency domain.

In some embodiments, the network side indicates the number of PRACH transmission occasions associated with an SSB index and the number of preambles corresponding to each SSB index by configuring a parameter ssb-perRACH-OccasionAndCB-PreamblesPerSSB. The above parameter is used for indicating the number of preambles used by a contention-based random access procedure.

In the parameter ssb-perRACH-OccasionAndCB-PreamblesPerSSB, the parameter ssb-perRACH-Occasion indicates the number of PRACH transmission occasions associated with each SSB index, and has values comprise {oneEighth, oneFourth, oneHalf, one, two, four, eight, sixteen}. For example, when the value of the parameter ssb-perRACH-Occasion is oneHalf (½), it means that one SSB index is associated with two PRACH transmission occasions; and when the value of the parameter ssb-perRACH-Occasion is two (2), it means that two SSB indices are associated with one PRACH transmission occasion.

In the parameter ssb-perRACH-OccasionAndCB-PreamblesPerSSB, the parameter CB-PreamblesPerSSB indicates the number of preambles corresponding to each SSB index. In some implementations, when the value of the parameter ssb-perRACH-OccasionAndCB-Preambles- PerSSB is oneHalf {n4}, it means that one SSB index is associated with two PRACH transmission occasions, and each SSB index corresponds to four contention preambles.

According to the above description, each SSB index may be associated with at least one PRACH transmission occasion, and a base station may indirectly obtain the information of an SSB index selected by the UE through detecting a PRACH transmission occasion used by the UE.

In some embodiments, when the network side configures N SSB indices, the N SSB indices may be associated with corresponding PRACH transmission occasions one by one according to a certain rule, and after each of the N SSBs is associated with one PRACH transmission occasion, it is deemed as one round of association. If there are still remaining PRACH transmission occasions, the N SSB indices will continue to be associated with the remaining PRACH transmission occasions until the remaining PRACH transmission occasions are insufficient to support a whole round of SSB index association mapping. In some embodiments, the final remaining PRACH transmission occasion(s) are not for PRACH transmission.

In some embodiments, the RA-RNTI is calculated based on the following parameters: the first OFDM symbol index of the second PRACH transmission occasion, the first time slot index of the second PRACH transmission occasion in one system frame, an index of the second PRACH transmission occasion in the frequency domain, and an uplink carrier ID for random access (for an ordinary uplink carrier, this value is 0; and for a supplemental uplink carrier, this value is 1). The first three items in the above parameters are determined by a time-frequency position of the second PRACH transmission occasion.

Figure 6:
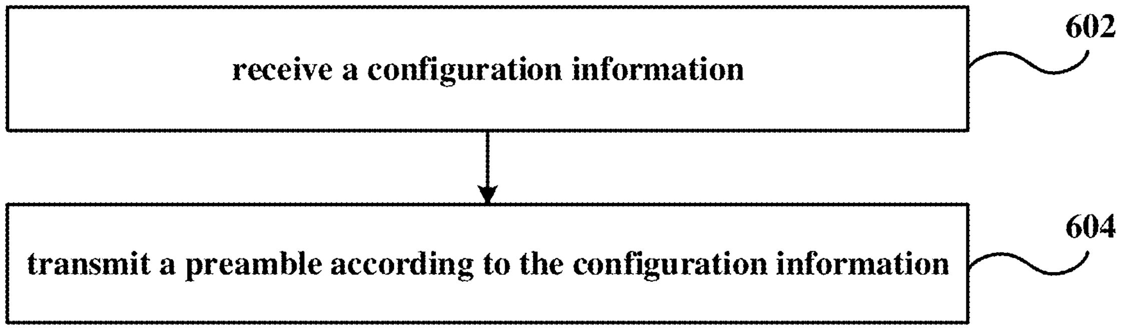
FIG. 6 is a flowchart of a method of PRACH transmission with repetition according to other embodiments of the present disclosure.

FIG. 6 is a flowchart of a Method of PRACH transmission with repetition according to other embodiments of the present disclosure.

At step 602, a configuration information is received by a UE. The configuration information indicates a first PRACH transmission resource only for PRACH transmission without repetition and a second PRACH transmission resource only for PRACH transmission with repetition.

At step 604, a preamble is transmitted by the UE according to the configuration information.

For example, when the UE performs a PRACH transmission without repetition, a preamble is transmitted at a first PRACH transmission occasion in the first PRACH transmission resource only for PRACH transmission without repetition.

For another example, when the UE performs PRACH transmission with repetition, a preamble is transmitted at a second PRACH transmission occasion in the second PRACH transmission resource only for PRACH transmission with repetition.

The UE may realize PRACH transmission without repetition or PRACH transmission with repetition according to the configuration information. Moreover, the UE uses different PRACH transmission resources when performing PRACH transmission without repetition and PRACH transmission with repetition, which can reduce the probability of resource conflict between PRACH transmission without repetition and PRACH transmission with repetition.

The implementations of step 604 will be described below in conjunction with different embodiments.

In some embodiments, the configuration information further comprises a set of candidate repetition numbers for PRACH transmission with repetition supported by the network side. In this case, the step of transmitting a preamble according to the configuration information at step 604 comprises: determining a repetition number m for PRACH transmission with repetition in the set of candidate repetition numbers for PRACH transmission with repetition; and transmitting a first preamble with repetition for m times by using the second PRACH transmission resource. The UE may select the repetition number for PRACH transmission with repetition from the set of candidate repetition numbers for PRACH transmission with repetition as required, which is helpful to reduce the resource waste.

In some embodiments, the configuration information further comprises at least one of a first parameter and a second parameter. The first parameter is used for indicating an associated relationship between each candidate repetition number for PRACH transmission with repetition and a preamble. The second parameter is used for indicating a first group of PRACH transmission occasions corresponding to each of at least some candidate repetition numbers for PRACH transmission with repetition.

In a case where the configuration information comprises the first parameter, the UE transmits a preamble associated with the repetition number for PRACH transmission with repetition selected by the UE according to the indication of the first parameter, which is helpful to reduce the probability of a resource conflict between the UE performing PRACH transmission with repetition and the UE performing PRACH transmission without repetition.

In a case where the configuration information comprises the second parameter, a first group of PRACH transmission occasions corresponding to the repetition number m for PRACH transmission with repetition are determined according to the second parameter; and the first preamble is transmitted with repetition for m times at the first group of PRACH transmission occasions corresponding to the repetition number m for PRACH transmission with repetition.

In the case where the network side configures the second parameter, the UE performs PRACH transmission with repetition at the first group of PRACH transmission occasions associated with repetition number m for PRACH transmission with repetition, which is helpful to reduce the probability of a resource conflict between the UE performing PRACH transmission with repetition and the UE performing PRACH transmission without repetition.

In some embodiments, different candidate repetition numbers for PRACH transmission with repetition are associated with different preambles. The UE selects different candidate repetition numbers for PRACH transmission with repetition to transmit a preamble so that a resource conflict between the UEs selecting different repetition numbers for PRACH transmission with repetition is avoided.

In some embodiments, the configuration information further comprises a third parameter. The third parameter is used for indicating an associated relationship between each SSB index and a preamble, and the first preamble belongs to preamble(s) associated with an SSB index selected by the UE.

In some embodiments, the first parameter is configured according to the third parameter, and for a specific configuration method, reference may be made to the above description. In this case, the first preamble belongs to preamble(s) associated with the repetition number m for PRACH transmission with repetition among M preambles associated with an SSB index selected by the UE.

For example, M=16, the set of candidate repetition numbers for PRACH transmission with repetition is {2, 4, 8}, and Q=3. In this case, $P=\lfloor 16/3 \rfloor=5$, M mod Q=1, the candidate repetition number 2 for PRACH transmission with repetition is associated with 6 preambles, and the candidate repetition numbers 4 and 8 for PRACH transmission with repetition are associated with 5 preambles respectively. If the repetition number for PRACH transmission with repetition selected by the UE is m=2, the first preamble sent by the UE will be one of 6 preambles associated with the repetition number 2 for PRACH transmission with repetition.

By way of the above method, the preamble sent by the UE belongs to preamble(s) associated with the repetition number m for PRACH transmission with repetition selected by the UE. When the network side receives the first preamble, not only the repetition number m for PRACH transmission with repetition may be determined, but also the SSB index selected by the UE may be determined. This facilitates the network side to distinguish between the UES selecting different SSB indices or different repetition numbers for PRACH transmission with repetition.

In some embodiments, the configuration information further comprises the fourth parameter. In this case, the UE transmits the first preamble with repetition for m times at the second group of PRACH transmission occasions corresponding to the repetition number m for PRACH transmission with repetition among a plurality of PRACH transmission occasions associated with the selected SSB index. The UE transmits a preamble with repetition designated by the network side at the PRACH transmission with repetition occasion designated by the network side. In the above circumstance, the network side may determine the repetition number for PRACH transmission with repetition selected by the UE according to one information of the received preamble or the second group of PRACH transmission occasions at which the preamble is received, and verify whether the determined repetition number for PRACH transmission with repetition is correct according to the other information.

In some embodiments, after sending a preamble, the UE further performs the following steps: receiving a second DCI; determining a RA-RNTI according to one PRACH transmission occasion among the first group of PRACH transmission occasions corresponding to the repetition number m for PRACH transmission with repetition; descrambling the second DCI by using the RA-RNTI to obtain a first DCI; and receiving a RAR according to the first DCI.

After sending the preamble, the UE monitors PDCCH in a time window of RAR. The PDCCH is used for carrying the second DCI sent by the network side. The UE monitors PDCCH to receive the second DCI. The second DCI is obtained by scrambling the first DCI using the RA-RNTI by the network side. To allow that the UE can successfully receive the RAR sent by the network side for the UE, the RA-RNTI value determined by the UE has to be the same as the network side. Therefore, when the UE has selected a group of PRACH transmission occasions, the UE selects, according to a pre-agreement with the network side, one PRACH transmission occasion from the first group of PRACH transmission occasions corresponding to the repetition number m for PRACH transmission with repetition to determine the RA-RNTI.

In some embodiments, the configuration information further comprises the fourth parameter. In this case, the one PRACH transmission occasion for determining the RA-RNTI belongs to a second group of PRACH transmission occasions corresponding to the repetition number m for PRACH transmission with repetition among the first group of PRACH transmission occasions associated with an SSB index selected by the UE.

In some embodiments, in the case where the network side configures the fourth parameter, there is an i such that a i-th PRACH transmission occasion among each second group of PRACH transmission occasions differs, and the one PRACH transmission occasion is the i-th PRACH transmission occasion. That is, one PRACH transmission occasion for determining the RA-RNTI value is the i-th PRACH transmission occasion. The above implementations can reduce the probability that the UEs selecting a plurality of PRACH transmission occasions associated with the same SSB index determines the same RA-RNTI, to reduce the probability of a resource conflict between different UEs.

In some embodiments, a subsequent random access procedure is performed in a case where the RAR carries the RAPID of the first preamble. In some embodiments, the RAR comprises information required by the UE to perform the subsequent random access procedure.

For other embodiments of the above method of PRACH transmission with repetition applied to UE, please refer to the above embodiments of the method of PRACH transmission with repetition applied to the network side, which will not be described in detail here.

Figure 7:
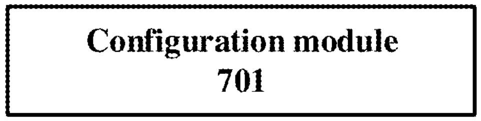
FIG. 7 is a schematic structural view showing an apparatus of PRACH transmission with repetition according to some embodiments of the present disclosure.

FIG. 7 is a schematic structural view showing an apparatus of PRACH transmission with repetition according to some embodiments of the present disclosure. The apparatus is applied to the network side.

As shown in FIG. 7, the apparatus of PRACH transmission with repetition comprises a configuration module 701.

The configuration module 701 is configured to configure a first PRACH transmission resource and a second PRACH transmission resource. The first PRACH transmission resource is only used for PRACH transmission without repetition. The second PRACH transmission resource is only used for PRACH transmission with repetition.

It should be understood that, the above apparatus of PRACH transmission with repetition may further comprise other module(s) to perform the method of PRACH transmission with repetition applied to the network side in any of the above embodiments.

Figure 8:
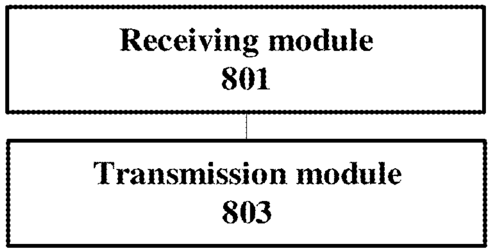
FIG. 8 is a schematic structural view showing an apparatus of PRACH transmission with repetition according to other embodiments of the present disclosure.

FIG. 8 is a schematic structural view showing an apparatus of PRACH transmission with repetition according to some embodiments of the present disclosure. The apparatus is applied to the UE.

As shown in FIG. 8, the apparatus of PRACH transmission with repetition comprises a receiving module 801 and a transmitting module 803.

The receiving module 801 is configured to receive a configuration information indicating a first PRACH transmission resource only for PRACH transmission without repetition and a second PRACH transmission resource only for PRACH transmission with repetition.

The transmission module 803 is configured to transmit a preamble according to the configuration information.

It should be understood that, the above apparatus of PRACH transmission with repetition may further comprise other module(s) to perform the method of PRACH transmission with repetition applied to UE in any of the above embodiments.

For other embodiments of the above apparatus of PRACH transmission with repetition, please refer to the above embodiments of a method of PRACH transmission with repetition, which will not be described in detail here.

Figure 9:
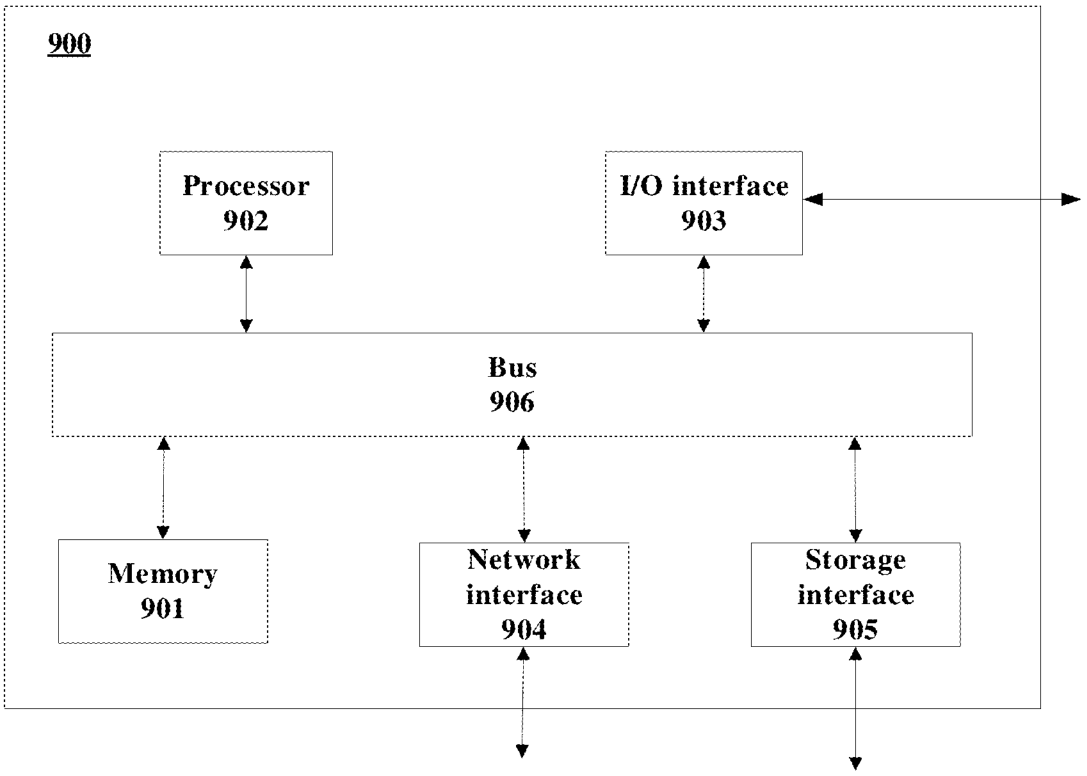
FIG. 9 is a schematic structural view showing an apparatus of PRACH transmission with repetition according to yet other embodiments of the present disclosure.

FIG. 9 is a schematic structural view showing an apparatus of PRACH transmission with repetition according to yet other embodiments of the present disclosure.

As shown in FIG. 9, the apparatus of PRACH transmission with repetition 900 comprises a memory 901 and a processor 902 coupled to the memory 901. The processor 902 is configured to perform any of the aforementioned methods applied to the network side or the UE based on instructions stored in the memory 901.

The memory 901 may comprise, for example, a system memory, a fixed non-volatile storage medium, and the like. The system memory may store, for example, an operation system, an application program, a boot loader, and other programs.

The apparatus of PRACH transmission with repetition 900 may further comprise an Input/Out (I/O) interface 903, a network interface 904, a storage interface 905, and the like. These interfaces 903, 904, 905 therebetween, as well as the memory 901 and the processor 902, may be connected, for example, via a bus 906. The I/O interface 903 provides a connection interface for input/output devices such as a display, a mouse, a keyboard, or a touch screen.

In some embodiments, the present disclosure also provides a base station, which comprises the apparatus of PRACH transmission with repetition in any of the above embodiments, for example, the apparatus of PRACH transmission with repetition shown in FIG. 7 or FIG. 9.

In some embodiments, the present disclosure also provides a UE, which comprises the apparatus of PRACH transmission with repetition in any of the above embodiments, for example, the apparatus of PRACH transmission with repetition shown in FIG. 8 or FIG. 9.

Figure 10:
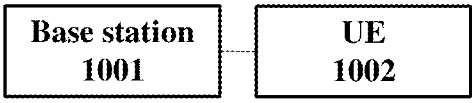
FIG. 10 is a schematic structural view showing a system of PRACH transmission with repetition according to some embodiments of the present disclosure.

FIG. 10 is a schematic structural view showing a system of PRACH transmission with repetition according to some embodiments of the present disclosure. The system of PRACH transmission with repetition comprises a base station 1001 and a UE 1002.

The embodiments of the present disclosure further provide a computer readable storage medium comprising computer program instructions that, when executed by a processor implement the method according to any of the above embodiments.

The embodiments of the present disclosure further provide a computer program product comprising a computer program that, when executed by a processor, implements the method according to any of the above embodiments.

Various embodiments in this specification are described in a progressive manner, differences from other embodiments are mainly illustrated in each embodiment, and reference may be made to each other for the same or similar parts between various embodiments. As for the embodiments of apparatus, since they substantially correspond to the embodiments of method, the descriptions are relatively simple. For relevant parts, reference may be made to description of the embodiments of method.

Hereto, various embodiments of the present disclosure have been described in detail. To avoid obscuring the concept of the present disclosure, some details commonly known in the art have not been described. From the above description, those skilled in the art may fully understand how to implement the technical solutions disclosed here.

Those skilled in the art should understand that the embodiments of the present disclosure may be provided as a method, a system, or a computer program product. Accordingly, the present disclosure may take the form of an entirely hardware embodiment, an entirely software embodiment, or a combination of software and hardware aspects. Moreover, the present disclosure may take the form of a computer program product implemented on one or more computer-usable non-transitory storage media (comprising but not limited to a disk memory, a CD-ROM, an optical memory, and the like) with computer usable program codes thereon.

The present disclosure is described with reference to the flowcharts and/or block diagrams of methods, devices (systems), and computer program products according to the embodiments of the present disclosure. It should be understood that a function specified in one or more processes in the flowcharts and/or one or more blocks in the block diagrams may be implemented by computer program instructions. These computer program instructions may be provided to a processor of a general purpose computer, a special purpose computer, an embedded processing machine, or other programmable data processing devices to produce a machine, such that a device for implementing a function specified in one or more processes of flowcharts and/or one or more blocks in block diagrams is produced by the instructions executed by a processor of a computer or other programmable data processing devices.

These computer program instructions may also be stored in a computer readable memory that can guide a computer or other programmable data processing devices to operate in a particular manner, such that the instructions stored in the computer readable memory produce an article of manufacture comprising an instruction device. The instruction device implements a function specified in one or more processes in flow charts or one or more blocks in block diagrams.

These computer program instructions may also be loaded onto a computer or other programmable data processing devices to perform a series of operational steps on the computer or other programmable devices to produce a computer-implemented process, such that the instructions executed on the computer or other programmable devices provide steps for implementing a function specified in one or more processes of the flowcharts and/or one or more blocks in the block diagrams.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments and equivalently substitution of a part of the technical features can be made without departing from the scope and spirit of the present disclosure. The scope of the present disclosure is defined by the appended claims.

What is claimed is:

1. A method for transmitting Physical Random Access Channel (PRACH) repetition, applied to network side, comprising:

configuring first PRACH transmission resources and second PRACH transmission resources, the first PRACH transmission resources being only used for PRACH transmission without repetition, and the second PRACH transmission resources being only used for PRACH repetition, wherein configuring the second PRACH transmission resources comprises:

configuring a set of candidate PRACH repetition numbers supported by network side and a first parameter indicating an associated relationship between each candidate PRACH repetition number and one or more preambles;

performing detection on at least some PRACH transmission occasions in the second PRACH transmission resources to obtain a first preamble transmitted with repetition by a user equipment (UE);

determining a random access radio network temporary identifier (RA-RNTI) according to one PRACH transmission occasion of the at least some PRACH transmission occasions, scrambling a first downlink control information (DCI) by using the RA-RNTI to obtain a second DCI; and sending the second DCI and a random access response (RAR) scheduled by the second DCI, wherein the RAR carries a random access preamble identifier (RAPID) of the first preamble.

2. The method according to claim 1, wherein configuring the second PRACH transmission resources further comprises:

configuring a second parameter, the second parameter being used for indicating a first group of PRACH transmission occasions corresponding to each of at least some candidate PRACH repetition numbers.

3. The method according to claim 1, wherein configuring the second PRACH transmission resources further comprises:

configuring a third parameter, the third parameter being used for indicating an associated relationship between each Synchronization Signal Block (SSB) index and one or more preambles.

4. The method according to claim 3, wherein the first parameter is configured according to the third parameter, each SSB index is associated with M preambles, and the set of candidate PRACH repetition numbers has Q candidate PRACH repetition numbers, where $P=\lfloor M/Q \rfloor$, M mod Q=K, and K candidate PRACH repetition numbers in the set of candidate PRACH repetition numbers are associated with P+1 preambles, and other candidate PRACH repetition numbers than the K candidate PRACH repetition numbers in the set of candidate PRACH repetition numbers are associated with P preambles, where M and Q are both greater than or equal to 1.

5. The method according to claim 2, wherein the second parameter comprises a bit sequence corresponding to each candidate PRACH repetition number, a sequence length of the bit sequence is equal to a maximum candidate PRACH repetition number in the set of candidate PRACH repetition numbers, each bit in the bit sequence corresponds to one PRACH transmission occasion, and a value of each bit in the bit sequence indicates whether a corresponding PRACH transmission occasion is used for transmission with repetition; and when the value is 1, it means that the corresponding PRACH transmission occasion is used for transmission with repetition; and when the value is 0, it means that the corresponding PRACH transmission occasion is not used for transmission with repetition.

6. The method according to claim 2, wherein configuring the second PRACH transmission resources further comprises:

configuring a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate PRACH repetition numbers among the plurality of PRACH transmission occasions associated with each SSB index.

7. The method according to claim 1, wherein configuring the second PRACH transmission resources further comprises:

configuring a second parameter, the second parameter being used for indicating a first group of PRACH transmission occasions corresponding to each of at least some candidate PRACH repetition numbers, wherein the at least some PRACH transmission occasions comprise the first group of PRACH transmission occasions.

8. The method according to claim 7, wherein configuring the second PRACH transmission resources further comprises:

configuring a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate PRACH repetition numbers among the plurality of PRACH transmission occasions associated with each SSB index, wherein the at least some PRACH transmission occasions comprise the second group of PRACH transmission occasions.

9. A method for transmitting Physical Random Access Channel (PRACH) repetition, applied to a User Equipment (UE), comprising:

receiving configuration information, the configuration information indicating first PRACH transmission resources only used for PRACH transmission without repetition and second PRACH transmission resources only used for PRACH repetition, wherein the configuration information further comprises a set of candidate PRACH repetition numbers supported by network side and a first parameter indicating an associated relationship between each candidate PRACH repetition number and one or more preambles; and transmitting a preamble according to the configuration information, comprising:

determining a PRACH repetition number m from the set of candidate PRACH repetition numbers, and transmitting m repetitions of a first preamble using the second PRACH transmission resources;

determining a random access radio network temporary identifier (RA-RNTI) according to one PRACH transmission occasion among a first group of PRACH transmission occasions corresponding to the PRACH repetition number m;

obtaining a first downlink control information (DCI) by using the RA-RNTI, and receiving a random access response (RAR) according to the first DCI.

10. The method according to claim 9, wherein the configuration information further comprises a second parameter, the second parameter being used for indicating the first group of PRACH transmission occasions corresponding to each of at least some candidate PRACH repetition numbers; and transmitting m repetitions of the first preamble using the second PRACH transmission resources comprises:

determining the first group of PRACH transmission occasions corresponding to the PRACH repetition number m according to the second parameter, and transmitting m repetitions of the first preamble at the first group of PRACH transmission occasions corresponding to the PRACH repetition number m, wherein the first preamble belongs to one or more preambles associated with the PRACH repetition number m.

11. The method according to claim 10, wherein the configuration information further comprises a third parameter, the third parameter being used for indicating an associated relationship between each Synchronization Signal Block (SSB) index and one or more preambles, wherein the first preamble belongs to one or more preambles associated with an SSB index selected by the UE.

12. The method according to claim 11, wherein:

the first parameter is configured according to the third parameter, each SSB index is associated with M preambles, and the set of candidate PRACH repetition numbers has Q candidate PRACH repetition numbers, where $P=\lfloor M/Q \rfloor$, M mod Q=K, wherein K candidate PRACH repetition numbers in the set of candidate PRACH repetition numbers are associated with P+1 preambles, and other candidate PRACH repetition numbers than the K candidate PRACH repetition numbers in the set of candidate PRACH repetition numbers are associated with P preambles, where M and Q are both greater than or equal to 1; and the first preamble belongs to one or more preambles associated with the PRACH repetition number m among M preambles associated with the SSB index selected by the UE.

13. The method according to claim 10, wherein the second parameter comprises a bit sequence corresponding to each candidate PRACH repetition number, a sequence length of the bit sequence is equal to a maximum candidate PRACH repetition number in the set of candidate PRACH repetition numbers, each bit in the bit sequence corresponds to one PRACH transmission occasion, and a value of each bit in the bit sequence indicates whether a corresponding PRACH transmission occasion is used for transmission with repetition; and when the value is 1, it means that the corresponding PRACH transmission occasion is used for transmission with repetition; and when the value is 0, it means that the corresponding PRACH transmission occasion is not used for transmission with repetition.

14. The method according to claim 10, wherein the configuration information further comprises a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate PRACH repetition numbers among the plurality of PRACH transmission occasions associated with each SSB index; and transmitting m repetitions of the first preamble at the first group of PRACH transmission occasions corresponding to the PRACH repetition number m comprises:

transmitting m repetitions of the first preamble at the second group of PRACH transmission occasions corresponding to the PRACH repetition number m among the plurality of PRACH transmission occasions associated with an SSB index selected by the UE.

15. The method according to claim 9, wherein:

the configuration information further comprises a fourth parameter, the fourth parameter being used for indicating an associated relationship between each SSB index and a plurality of PRACH transmission occasions, wherein the first group of PRACH transmission occasions comprise a second group of PRACH transmission occasions corresponding to each of the at least some candidate PRACH repetition numbers among the plurality of PRACH transmission occasions associated with each SSB index; and the one PRACH transmission occasion belongs to a second group of PRACH transmission occasions corresponding to the PRACH repetition number m among the plurality of PRACH transmission occasions associated with an SSB index selected by the UE.

16. A base station, comprising:

a memory; and a processor coupled to the memory, and configured to, based on instructions stored in the memory, perform the method for transmitting PRACH repetition according to claim 1.

17. A UE, comprising:

a memory; and a processor coupled to the memory, and configured to, based on instructions stored in the memory, perform the method for transmitting PRACH repetition according to claim 9.

18. A non-transitory computer readable storage medium, comprising computer program instructions, wherein the computer program instructions, when executed by a processor, implement the method for transmitting PRACH repetition according to claim 1.

19. A method for transmitting Physical Random Access Channel (PRACH) repetition, applied to a User Equipment (UE), comprising:

receiving configuration information, the configuration information indicating first PRACH transmission resources only used for PRACH transmission without repetition and second PRACH transmission resources only used for PRACH repetition, wherein the configuration information further comprises a set of candidate PRACH repetition numbers supported by network side and a first parameter indicating an associated relationship between each candidate PRACH repetition number and one or more preambles;

transmitting a preamble according to the configuration information, comprising:

determining a PRACH repetition number m from the set of candidate PRACH repetition numbers, and transmitting m repetitions of a first preamble using the second PRACH transmission resources;

receiving a second first downlink control information (DCI);

determining a random access radio network temporary identifier (RA-RNTI) according to one PRACH transmission occasion among a first group of PRACH transmission occasions corresponding to the PRACH repetition number m;

descrambling the second DCI by using the RA-RNTI to obtain a first DCI; and receiving a random access response (RAR) according to the first DCI.

* * * * *